United States Patent [19]

Thurman

[11] 3,868,824
[45] Mar. 4, 1975

[54] MODULAR OIL CONTAINMENT BOOM
[75] Inventor: Robert K. Thurman, Carmel, N.Y.
[73] Assignee: Merritt Division of Murphy Pacific Marine Salvage, New York, N.Y.
[22] Filed: July 2, 1973
[21] Appl. No.: 375,767

Related U.S. Application Data
[63] Continuation-in-part of Ser. No. 78,801, Oct. 7, 1970, Pat. No. 3,751,925.

[52] U.S. Cl. ............................................. 61/1 F
[51] Int. Cl. ......................................... E02b 15/04
[58] Field of Search.... 61/1 F, 5; 210/242, DIG. 21; 160/124

[56] References Cited
UNITED STATES PATENTS
| | | | |
|---|---|---|---|
| 2,894,575 | 7/1959 | Kalder | 160/124 |
| 3,651,647 | 3/1972 | Flaviani | 61/1 F |
| 3,688,506 | 9/1972 | Marcocchio | 61/1 F |
| 3,710,577 | 1/1973 | Matheson | 61/1 F |
| 3,751,925 | 8/1973 | Thurman | 61/1 F |

FOREIGN PATENTS OR APPLICATIONS
| | | | |
|---|---|---|---|
| 1,558,927 | 1/1969 | France | 61/1 F |
| 637,856 | 10/1936 | Germany | 61/1 F |

Primary Examiner—Paul R. Gilliam
Assistant Examiner—David H. Corbin
Attorney, Agent, or Firm—Brumbaugh, Graves, Donohue & Raymond

[57] ABSTRACT

A floating oil containment boom is formed of a multiplicity of boom modules which may easily be connected and disconnected while afloat. The modules include a vertical barrier member, on both sides of which are connected a pair of foam-filled drums. A flexible waterproof panel having a zipper on each end is secured to the barrier member by use of battens fastened to the barrier member over the panel and outside a welt formed on the panel edges where the panel overlaps the barrier member. A piping is formed adjacent and parallel to the zipper on the end of the panel for use in connection with a slotted tube as an auxiliary means for fastening adjacent panel ends together. A set of chains is provided for interconnecting the top and bottom end corners of adjacent barrier members together to prevent excessive vertical and angular displacement between adjacent modules to prevent stressing of the flexible panel by heavy wave action.

4 Claims, 3 Drawing Figures

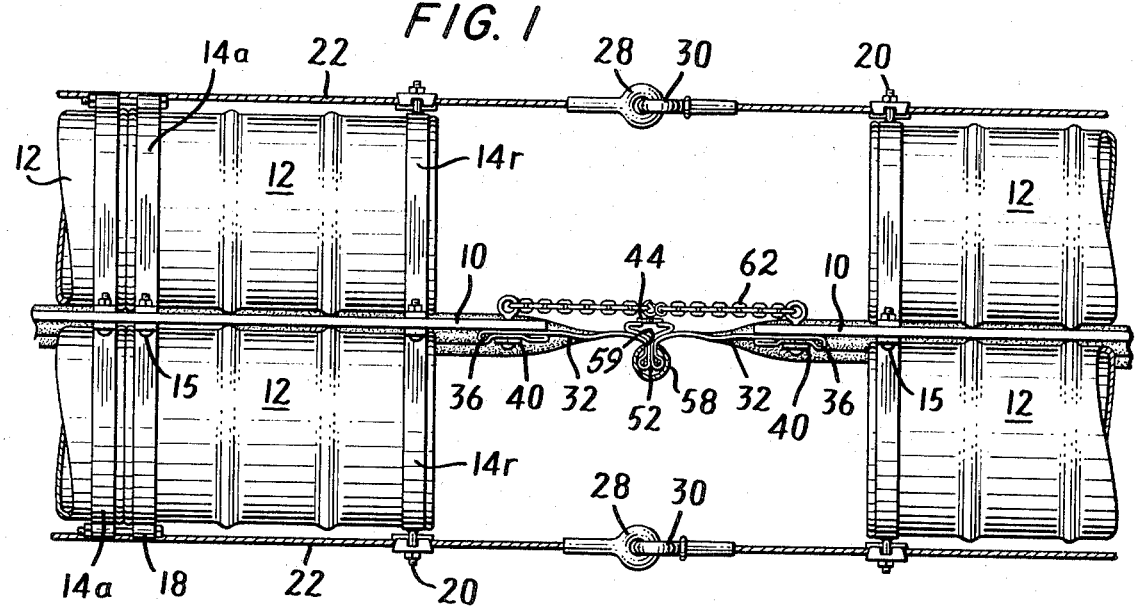
FIG. 1
FIG. 3
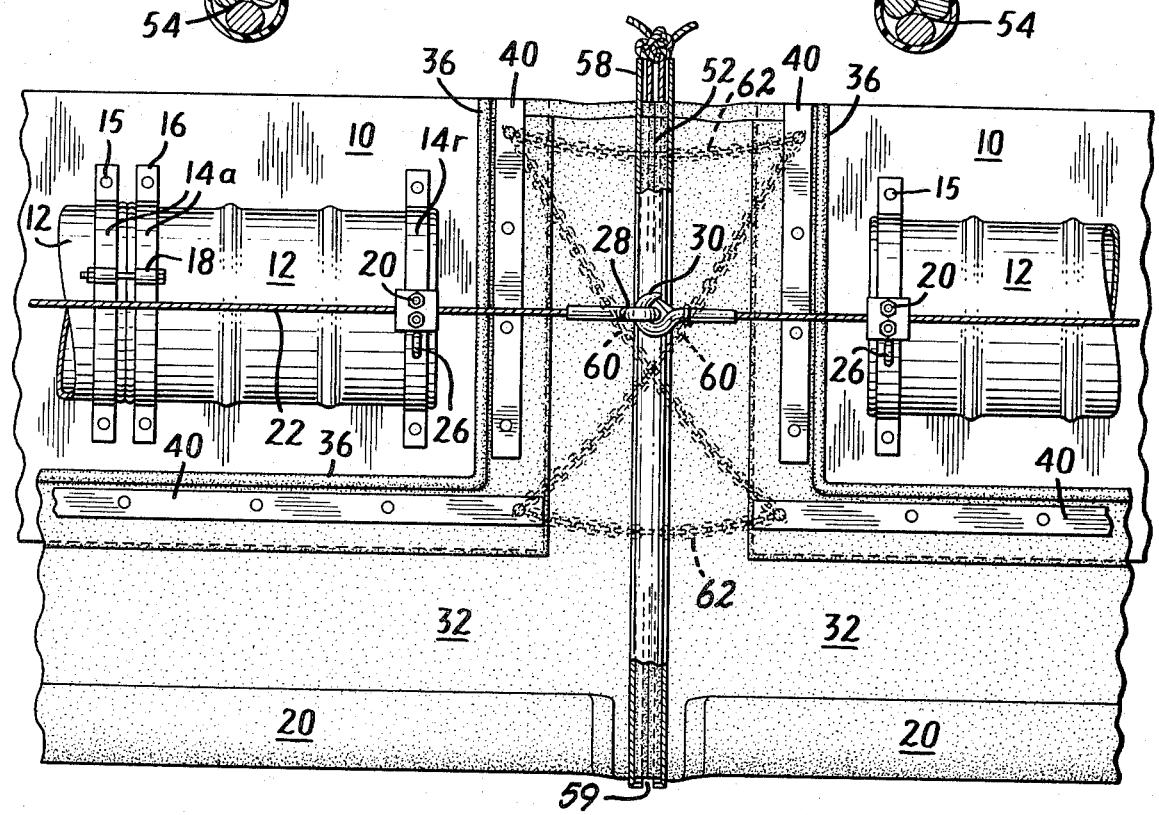
FIG. 2

MODULAR OIL CONTAINMENT BOOM

BACKGROUND OF THE INVENTION

This application is a continuation-in-part application from my prior application Ser. No. 78,801 filed on Oct. 7, 1970, now U.S. Pat. No. 3,751,925, and incorporates by reference the entire disclosure contained in said prior application.

During use of the oil containment boom described in the aforesaid parent application, hereinafter referred to as my early boom, it became apparent that certain features not provided by that boom would considerably increase the deployment speed of the boom and provide certain improved structural characteristics and usage flexibilities.

In particular, it was found that when my early boom was deployed across a harbor mouth to prevent ingress of floating oil, it did indeed exclude ingress of oil into the harbor mouth, but also impeded passage of boats and other water traffic. To open the boom to permit passage of such vessels was a major undertaking involving disconnecting of the mooring cables and towing the boom out of the way. The boom while protecting the beaches from damage by floating oil, thus caused an inconvenient impediment to waterborne traffic. It was thus concluded that it would be advantageous to provide a means in my early oil containment boom for quickly and easily opening and closing an entrance through the boom to avoid the necessity of the aforesaid moorage disconnection and towing.

During testing of my early boom, it became apparent that there was an additional extremely advantageous and useful function for the boom other than oil containment, namely, collection of floating oil. By connecting the two ends of the boom to a pair of vessels such as tugboats, a long boom could be towed lengthwise along, for example, a long oil slick, thereby collecting all the oil in the slick which could then be skimmed from the water surface by a suitable oil skimmer. It was realized that certain considerable advantages would be gained by mounting a floating skimmer in the center of the boom which could then skim the oil as it was collected by the boom and deposit it into a succession of transfer vessels. To this effect, it would be advantageous to provide a means for opening the boom at any desired location for the purpose of inserting an oil skimmer or other oil collection or treatment apparatus in the oil boom.

As conditions change in an oil containment or collection situation, it is sometimes desirable to change the length or configuration of the boom by inserting or removing one or more boom modules. In addition, if one or more boom modules became damaged, as by collision with a vessel or by an oil fire, it is desirable to be able to replace the damaged section with a new section. Such insertion and removal of sections of my early boom was difficult because of its integral nature. It was thus concluded that for all the aforesaid reasons it would be desirable to provide a means for opening the boom at any place along its length to enable the boom to be lengthened, shortened, or replaced in part.

The launching of my early boom was a somewhat lengthy procedure because it had to be assembled on dry land and then launched in assembled condition by the means of cranes and the like. While this impediment did not constitute a disadvantage in locations having an assembled boom in reserve, it did necessitate a certain delay when the boom had to be transported and assembled at the site of an oil spill. It was thus concluded that it would be advantageous to redesign certain aspects of my early boom to enable it to be assembled quickly in the water from complete self-contained modules.

During operation of my early boom in heavy seas, it was found necessary to provide considerable slack in the fabric panels between the float units to assure that the stress wires linking the float units would prevent stressing of the panels under certain very rough conditions with the boom oriented in a certain direction to the direction of the wave action. To eliminate the need for this excessive slack and to protect the fabric panels from stress in these conditions, it was concluded that auxiliary linking means should be provided between the modules which would bear the stress introduced by these conditions but would not prevent easy opening of the boom at any desired location.

SUMMARY OF THE INVENTION

Accordingly, this invention provides a floating oil containment boom modules which, while afloat, can be connected easily and rapidly end to end with other like modules to form a boom. The boom can be rapidly assembled and disassembled, and can be opened to any point along its length to allow removal or insertion of additional modules or open a passage for waterborne traffic. The flexible waterproof panels which provide oil containment continuity between adjacent float units are secured to the float units in such a manner to assure that they will not pull free, and are connected to adjacent panels with a seal that provides excellent watertight integrity between adjacent panels. The flexible fabric panels between adjacent modules is protected against stress caused by wave action traveling in a direction parallel to the length of the boom.

These and other objects of the invention are provided by a boom formed of modules having a rigid barrier member, to both sides of which are rigidly secured a pair of flotation drums. A U-shaped fabric panel is secured to the barrier member by means of battens secured to the barrier member which clamp the fabric panel to the barrier member. A welt sewn on the inside edge of the fabric panel prevents the panel from being pulled out from under the battens. The end edges of the fabric panel are provided with zippers and an adjacent parallel piping which can be securely held to a similar piping on the adjacent edge of an adjacent panel by means of a slotted tube. A stress cable is secured to the extreme outboard edge of each side of the module, and connectors are provided on each end of the stress cables by means of which they may be connected to the ends of the stress cables or adjacent modules. Auxiliary stress bearing chains are provided between the top and bottom corners of adjacent barrier members to prevent stressing the fabric panel when wave action down the length of the boom causes relative vertical or angular translation between adjacent modules. The easily disconnectable nature of the main stress cables, the auxiliary stress chains, and the connection of the fabric panels enables the boom to be assembled quickly and easily in the water and enables easy and rapid disconnection and connection at any point in the boom after it is assembled to allow removal of damaged boom modules, insertion of new boom modules, or allow the passage of water traffic through the boom.

BRIEF DESCRIPTION OF THE DRAWINGS

The invention and its many attendant objects and advantages may be better understood from the following detailed description of a preferred embodiment taken in conjunction with the accompanying drawings, in which:

FIG. 1 is a plan view, partly in section, of a junction between two interconnected modules;

FIG. 2 is an elevation of the junction shown in FIG. 1; and

FIG. 3 is an enlarged sectional plan view of the zippered edges of the flexible panels on adjacent modules.

DESCRIPTION OF THE PREFERRED EMBODIMENT

Referring to the figures wherein like numerals designate identical or corresponding parts, and more particularly to FIG. 1 thereof, a section of an oil containment boom is disclosed whose overall organization is generally similar to the boom disclosed in my prior U.S. application, Ser. No. 78,801. It is formed of a multiplicity of similar boom modules linked by a stress wire connected to each outboard extremity of each boom module. The lead module has fastened thereto a bow plane to facilitate towing as disclosed in my aforesaid prior U.S. application.

A barrier member 10 formed of a rigid, structurally strong and water resistant material such as ¾ inch Marine Fir Plywood approximately 8 feet long and 4 feet high has a pair of 55 gallon drums 12, filled with polyurethane foam, clamped centrally to the barrier member 10. Each end of each drum 12 is clamped to the barrier member 10 by a barrel clamp 14. The drum clamps 14 are U-shaped heavy metal straps having an out-turned flange 16 at the end of each leg which abuts the barrier member 10. The clamps 14 are fastened rigidly to the barrier member 10 by means of fasteners 15 such as half inch bolts.

Each of the drum clamps 14a on the adjacent ends of the drums on each side of the barrier member 10 has a short length of ¾ inch pipe 18, approximately as long as the drum clamp 14 is wide, welded thereto slightly above the horizontal centerline through the drums. A half inch bolt approximately 6.5 inches long extends through the aligned pipes 18 and a nut is threaded on the bolt for the purpose of rigidly clamping the adjacent ends of the drums and clamps together to prevent relative movement between them and rigidify the entire structure.

The drum clamps 14r on the remote ends of the drums have welded thereto, on the horizontal centerline through the drums, a U-bolt 20 opening outwardly. The U-bolt 20 forms part of a cable clamp which is completed by the insertion of a short length of ¾ inch diameter bar stock between the legs of the U-bolt next to which is laid the cable 22, over which is laid a clip. The cable 22 is firmly clamped between the bar stock and the clip by means of a pair of nuts threaded on the arms of the U-bolt.

Adjacent to and slightly below the cable clamp is a second U-bolt 26 facing inwardly, the ends of the arms of which are welded to the clamp 14r. This second U-bolt provides a convenient connection for mooring cables and the like.

The cable 22 clamped to the remote ends of the drum 12 on each side of the module is approximately 10 feet long and has attached to one end, as by swedging or the like, a heavy ring 28. A heavy hook 30, best shown in FIG. 2, is attached to the other end, also by swedging or the like. By this arrangement, adjacent modules may be linked for towing and mooring by passing the hook 30 at one end of a module cable 12 through a ring 28 on the adjacent end of an adjacent module cable 12.

A flexible panel 32 of waterproof material, such as 22 once Facilon, a resin bonded fabric, is fastened to the barrier member 10 as shown in FIG. 2. The panel extends from the top edge of the barrier member 10 down approximately 30 inches below the lower edge of the barrier member so that the vertical extent of the module below the surface of the water is approximately 3.5 feet. This has been found to be sufficiently deep to prevent all but the strongest currents from carrying entrained oil under the oil boom.

To prevent the fabric panel from being pulled away from the barrier member by heavy sea action or the like, and to preserve material and decrease weight, the panel 32 is formed in the shape of a broad U, having a cutout in the top of the panel approximately 7 feet long and 42 inches deep. The edges of the cutout are formed in a welt produced by folding over the edges of the panel to form a 4 inch hem over a ¼ inch thick rope and stitching the hem at the edge of the fabric and again near the edge of the hem, holding the rope at the extreme inner edge of the cutout. The bead or welt 36 formed by the rope stitched in the edge of the hem, enables the panel to be securely anchored to the barrier member 10 by means of battens 40 which may be lengths of one half inch thick Marine Fir Plywood 3 inches wide running along each of the three edges of the cutout adjacent to and outside the welt 36. The battens 40 are fastened securely to the barrier member 10, over the edges of the panel 32, by means of a one half inch bolt. The welt 36 prevents the panel 32 from being pulled out from under the battens by heavy seas or towing stresses.

A ballast pocket 42 is formed on the bottom edge of the fabric panel by turning up the lower edge and stitching a hem at the top of the turned over portion. Ballast such as one inch proof coil chain (not shown) may be inserted into the pocket to hold the flexible panel down vertically.

As best seen in FIG. 3, each end of the fabric panel 32 has stitched along its entire vertical extent one half of a zipper 44 to enable adjacent ends of the fabric panels on adjacent modules to be fastened together. The zipper is stitched to the outside edge of a wide hem 46 to lend strength to the connection between the zipper and the fabric panel. The hem 46 also provides a pouch 48 into which a pouch rod 50 may be slipped to hold the edge of the fabric panel 32 stiff and prevent the adjacent edges of adjacent fabric panels from curling upward and away from each other due to the buoyancy of the fabric panel in water. After the zipper 44 connection has been made, the pouch rods 50 are removed.

A supplemental connection means between adjacent panel edges is provided by a piping 52 which is formed on the fabric panel 32 adjacent the side of the pouch 48 remote from the zipper 44. The piping is formed by a short vertical fold in the fabric panel 32 around a length of one half inch manila rope 54. The fabric is stitched tight against the rope and is stitched again along the fold one half inch away from the rope 54 to provide a short neck 56. The supplemental fastening is accomplished by the use of a 6 foot length of 1.5 inch diameter polyvinylchloride tube 58 having a ¼ inch wide slot 59 through the wall of the pipe and running lengthwise from one end to within 3 inches of the other end. The ropes 54 and the necks 56 of adjacent panel edges are brought together and the piping tube 58 is slid down around the ropes 54 with the necks 56 extending out through the slot 59. The piping tube 58 presses the piping 52 firmly together to provide an excellent watertight seal between adjacent panel edges.

The ropes 54 extend a foot or so above the top edge of the fabric panel 32. After the piping tube 58 has been slid down over the piping 52, the ends of the ropes 54 are knotted over the top of the tube to hold the tube down and prevent it from being worked loose by wave action and the like.

To prevent wave action, running down the length of the boom, from stressing the flexible panel 32, several auxiliary stress bearing chains, best shown in FIG. 2, are provided between adjacent modules. Relative vertical displacement between adjacent modules is prevented by a pair of diagonal chains 60 running from the top corner of one barrier member 10 to the bottom corner of the adjacent barrier member 10, and from the top corner of the adjacent barrier member to the bottom corner of the first barrier member. Each chain 60 is permanently fastened at one end to barrier member 10 at the bottom corner and is provided at the other end with a snap hook with which the chain 60 may easily be connected and disconnected to a ring secured to the top corner of an adjacent barrier member.

To prevent rotational displacement between adjacent modules, such as might occur in a trough between waves or at the top of the wave, cross chains 62 are provided between adjacent top corners of adjacent barrier members and between adjacent bottom corners of adjacent barrier members. These chains are provided with snap hook connections at their centers so that the cross chain between lower adjacent corners of adjacent barrier members can be connected, while the modules are afloat, by lifting the ends of the chains and connecting them together above the water line. This feature obviates the necessity of awkwardly reaching between adjacent modules down below the water line to make the chain connection between bottom barrier corners and facilitates the connection and disconnection of modules.

A 6 foot pole having a hook and a small tang on one end has been found useful in assembling and disassembling a boom from these modules. The small tang can be inserted into a hole in the zipper tongue and the pole used to push the zipper down to complete the underwater portion of the zipper connection when the panels are zippered together; the hook may be used in a similar manner in opening the zipper during disassembly. The hook is also useful in raising the lower cross chains 62 above the water to unsnap them during disassembly.

Thus, a module of an oil containment boom has been shown which may easily and rapidly be connected together by means of (1) the releasable attachment means at the end of the main stress cables, (2) the simple and secure means for connecting the adjacent fabric panel edges, and (3) the easily connectable and disconnectable attachment means for the diagonal and cross auxiliary stress bearing chains between adjacent modules.

The module was designed for extended open sea operation and was therefore designed to withstand extremely severe conditions. The secure connection of the fabric panels to the barrier member, the rugged construction of the drum clamps, the simple and reliable connection of the adjacent edges of the fabric panels and the several stress bearing cables and chains enable a boom constructed from these modules to survive the rigors of open sea use long after most other presently available booms have been torn apart by the sea.

Obviously, numerous modifications and variations of this invention are possible in light of the foregoing description of a preferred embodiment. For example, other conventional connectors may be used for the connection at the end of the main stress bearing cables, or the connector could be displaced from the center location as shown closer to or at one end of a boom module. Moreover, other materials may be substituted for those specified above for particular applications. For example, fireproof materials may be used in lieu of or as protection for the materials specified above for containment of floating oil fires. Thus, it is expressly to be understood that these and other modifications may be made to the disclosed embodiment while remaining within the spirit and scope of the appended claims.

I claim:

1. A module for an oil containment boom formed of a plurality of such modules connected end-to-end, comprising:

a vertical barrier member;

at least one flotation unit secured to each side of said barrier member;

a U-shaped panel of flexible waterproof material secured to said barrier member;

means for securing said panel to said barrier including a welt formed on the inner edges of the panel and a batten secured to the barrier outside and adjacent the welt and clamping the panel to the barrier;

a piping formed on said panel adjacent and parallel to each outside end edge thereof for cooperation with a similar piping on an adjacent module panel and a slotted tube to form a seal between adjacent module panels;

linking means secured to the outboard extremity of said flotation units on each side of said barrier member for linking a plurality of said modules for towing and mooring as a boom without stressing said panel;

means on each end of each linking means for releasable attachment to an adjacent end of a stress wire on an adjacent module; and auxiliary linking means connected to the top and bottom end corners of said barrier member for linking to the top and bottom end corners of the adjacent end of an adjacent module barrier member when said modules are assembled as an oil containment boom.

2. A module for a containment boom for containing oil and the like on the surface of a body of water, comprising:

a. a rigid barrier member including a thin rectangular sheet of rigid material, b. flotation means adapted to support said barrier member in substantially vertical position with a portion extending above a water surface and another portion submerged, including at least one sealed drum rigidly secured to each side of said sheet,
c. a panel of flexible waterproof material connected to at least one end of said rigid barrier member;
d. connection means for connecting said panel of flexible waterproof material at one end edge thereof to an adjacent module when a plurality of said modules are connected together as an oil containment boom;
e. linking means for linking a plurality of said modules together for towing and mooring as an oil containment boom without stressing said flexible panel including,
  i. a pair of cables secured to said module, one on each side of said barrier member, at the outboard extremity of each end of said module,
  ii. a connecting line fastened to the top of said rigid barrier member at one end thereof for connection to an adjacent top end of a barrier member of an adjacent module,
  iii. a second connecting line fastened to said barrier member of said module at the bottom of said one end thereof below said first connecting line for connection to the adjacent bottom end of the barrier member of said adjacent module,
  iv. a third connecting line connected to said bottom end of said barrier member for connection to the adjacent end of said barrier member of said adjacent module at the top thereof, and
  v. a connector for connecting the loose end of a fourth connection line fastened to the bottom end of said adjacent module barrier member to said top end of said barrier member.

3. A module as defined in claim 1 wherein said connection means comprises:
a welt formed on an edge of said panel of flexible waterproof material remote from the connection of said waterproof material to said one end of said rigid barrier member; and
a tube substantially as long as said panel is high and having means formed therein defining a longitudinal slot through the wall of said tube, whereby said tube can be slid over and hold adjacent welts on adjacent panel edges to sealably connect the adjacent edges of said panels.

4. A module as defined in claim 1 wherein said panel of flexible waterproof material is generally U-shaped and is fastened to said rigid barrier member continuously around the two ends and the bottom thereof.

* * * * *